UNITED STATES PATENT OFFICE.

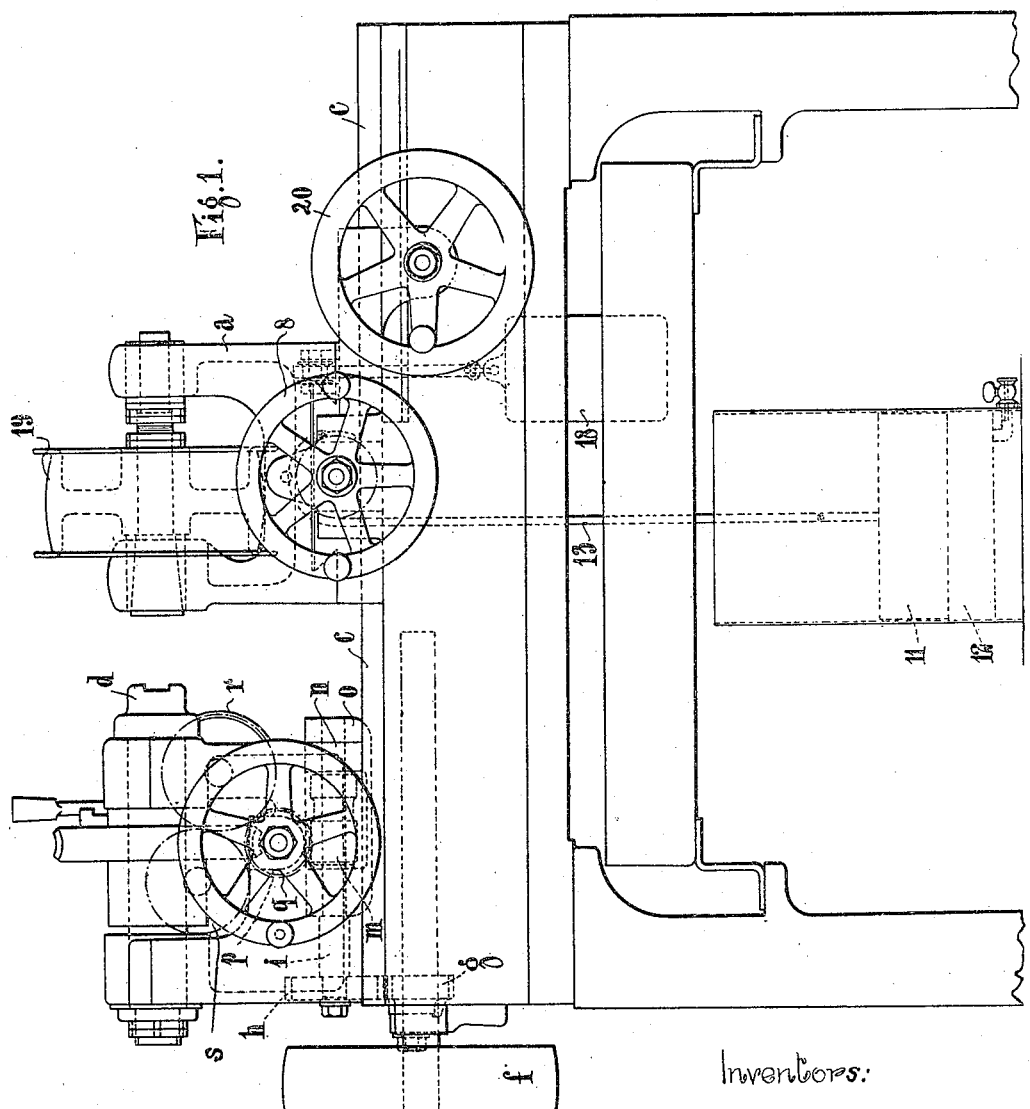

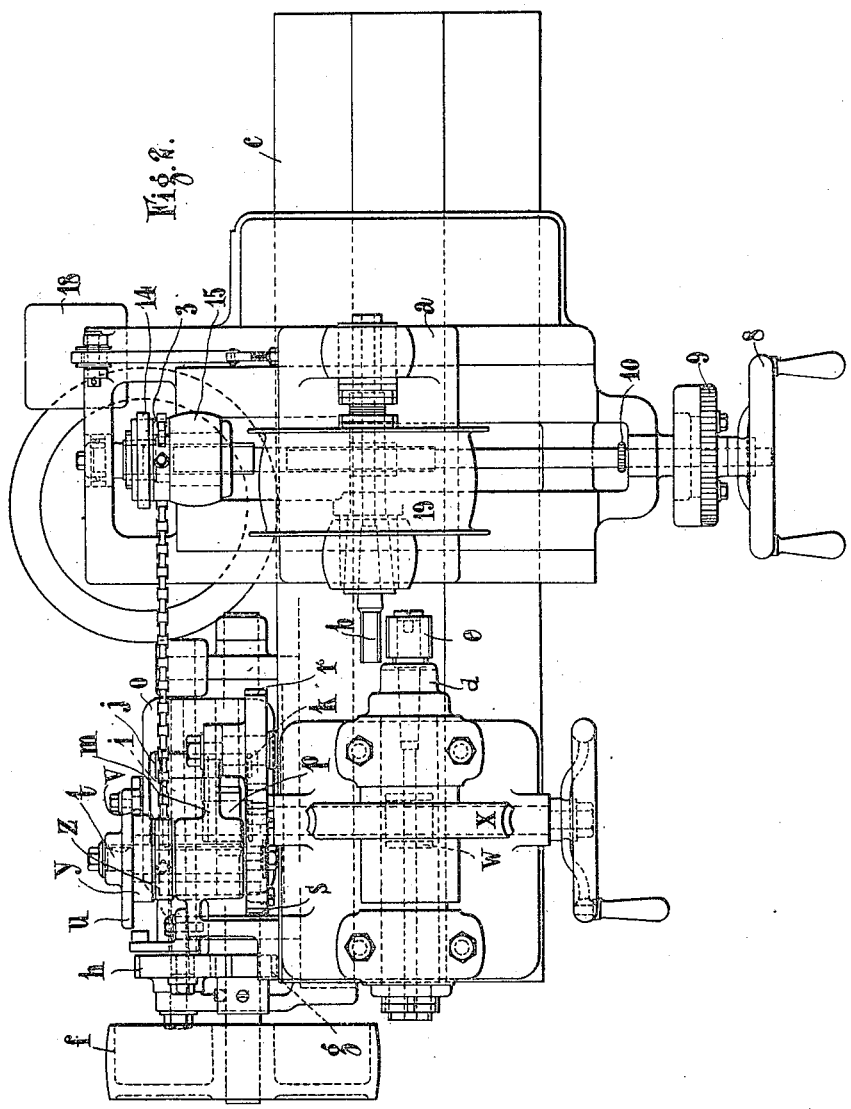

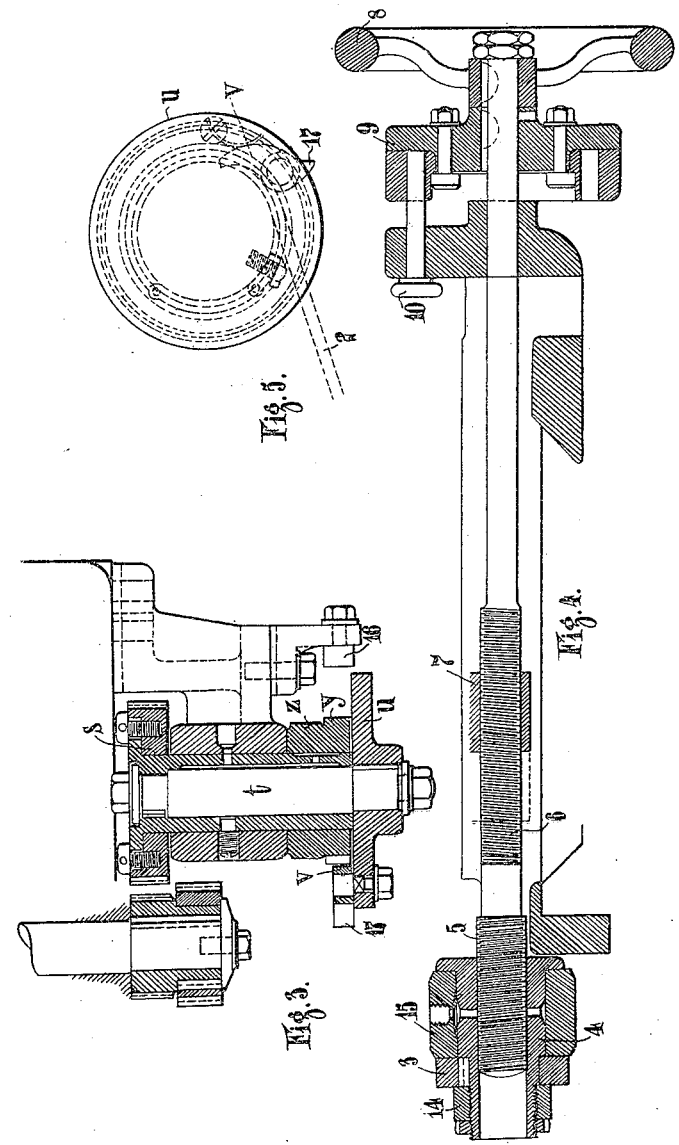

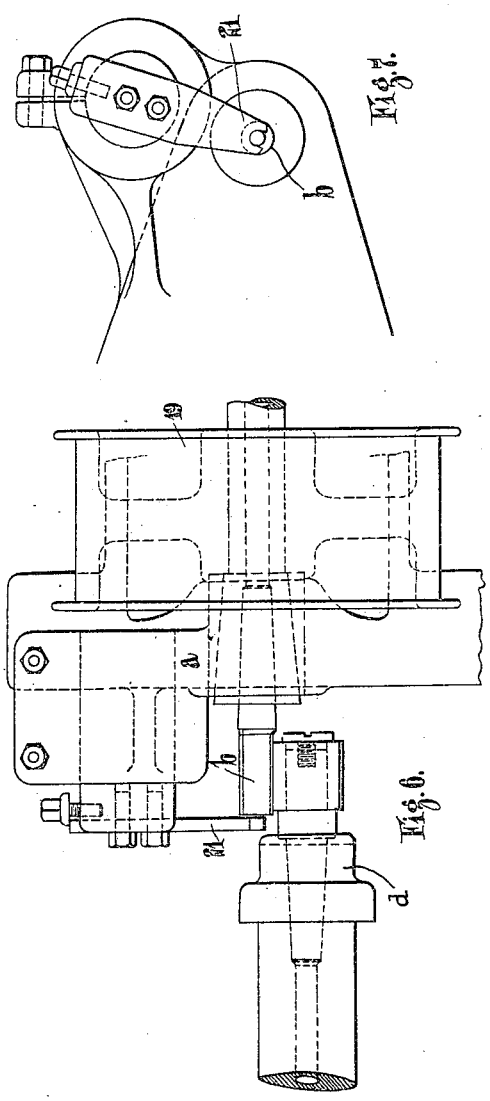

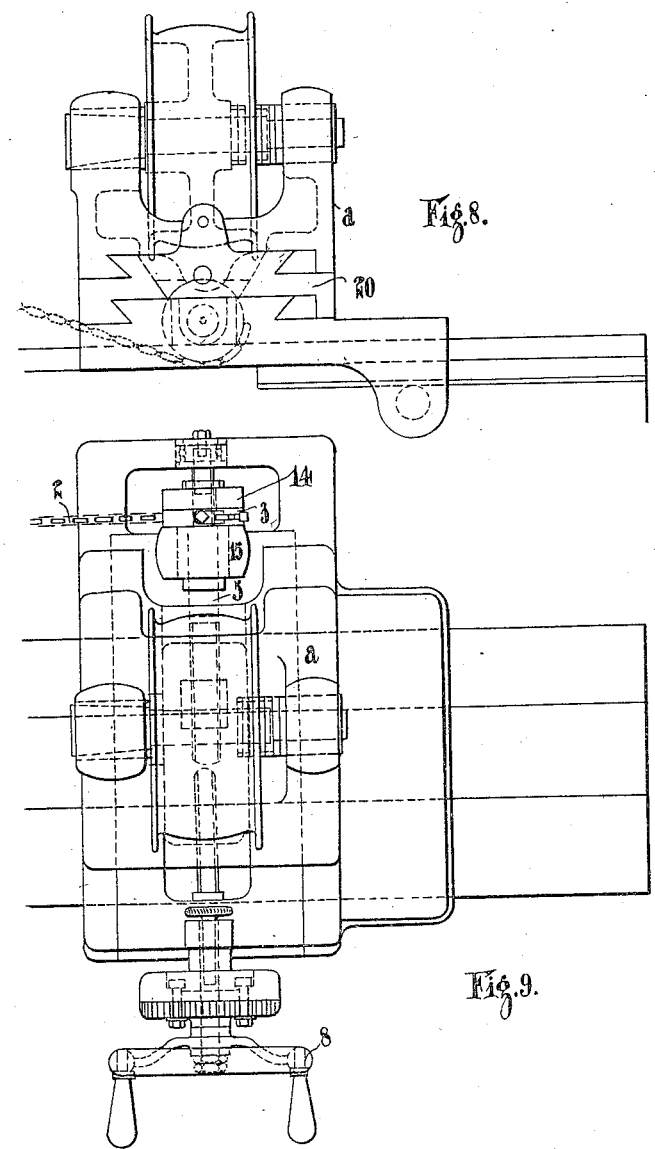

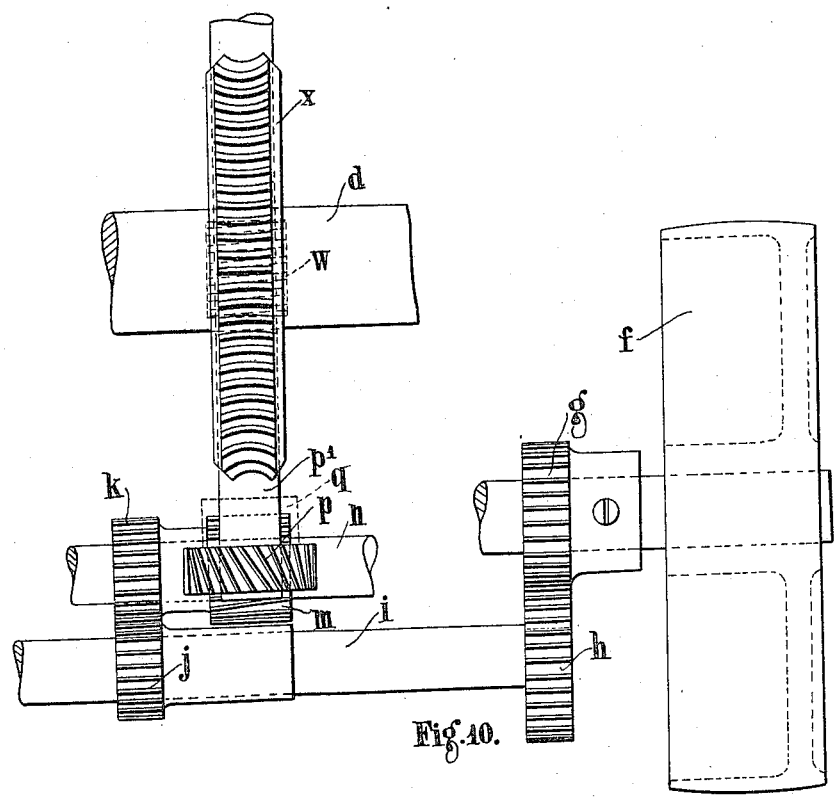

HUBERT ARUNDEL AND JOSEPH HIGGINSON, OF STOCKPORT, ENGLAND.

LATHE.

1,259,712.  Specification of Letters Patent.  Patented Mar. 19, 1918.

Application filed November 18, 1916.  Serial No. 132,185.

*To all whom it may concern:*

Be it known that we, HUBERT ARUNDEL and JOSEPH HIGGINSON, subjects of the King of Great Britain and Ireland, and residents of Sovereign Works, Stockport, in the county of Chester, England, have invented certain new and useful Improvements Relating to Lathes, of which the following is a specification.

This invention has for its object to provide improved backing-off or relieving means for lathes for the rapid, economical and efficient production of milling cutters.

Referring to the accompanying sheets of explanatory drawings:—

Figure 1 is a front elevation and Fig. 2 a plan view of a relieving lathe constructed in one convenient form in accordance with our invention.

Figs. 3, 4 and 5 are detail views to be hereinafter referred to.

Figs. 6 and 7 are respectively plan and end elevation of means for supporting the overhanging end of the cutting tool.

Fig. 8 is a front view of a modified arrangement of the cutter head, with the indexing arrangement removed for the sake of clearness.

Fig. 9 is a plan view of the parts shown in Fig. 8, but with the indexing arrangement in place.

Fig. 10 is a detailed diagram showing the arrangement of the gearing for driving the work mandrel.

The same reference letters in the different views indicate the same or similar parts.

The slide $a$ carrying the cutting tool $b$ is adapted to be traversed across the lathe bed $c$ for backing off or relieving purposes by a screw and nut device in operative connection with the work carrying mandrel $d$ in order to obtain the necessary unison of movements. The cutter being produced is shown at $e$, Fig. 2. Such operative connection may be obtained by suitable gearing (giving the required number of backing-off traverses to the cutting tool slide for a complete turn of the cutter being produced) and a chain, the said chain being actuated through a clutch.

The means for traversing the cutter head from the work mandrel driving gear are as follows:—

The belt pulley $f$ (Figs. 1, 2 and 10) by means of spur wheels $g$, $h$, shaft $i$ and spur wheels $j$, $k$ rotates a spiral gear $m$ on a spindle $n$ in a movable gear box $o$, the latter being pivotally supported in the known manner about the spindle $i$ so that it can fall to put the spiral gear $m$ out of engagement with a spiral gear $p$. On the shaft $p'$ carrying the spiral gear $p$ there is a spur pinion $q$ (indicated by dotted lines in Fig. 10; see also Fig. 3) meshing with an intermediate spur wheel $r$ in gear with a wheel $s$ on a spindle $t$ carrying the disk $u$ having a pawl $v$ thereon (see Fig. 3). The spindle $p'$ carrying the spiral gear wheel $p$ and spur pinion $q$ forms the driving spindle of the work mandrel $d$ through the worm $w$ and worm wheel $x$ (see Figs. 2 and 10). Thus the rates of rotation of the disk $u$ and of the work mandrel are definitely proportioned in accordance with the size of the spur wheels $q$ and $s$.

The pawl $v$ on the disk $u$ is adapted to engage a notch or single tooth in a wheel or collar $y$ forming part of a chain block $z$ (see Fig. 3) to which one end of a chain 2 is secured. The other end of said chain is secured to a chain block 3 (see Fig. 4) which is keyed upon a nut-like part 4 working in conjunction with a screw 5. The latter has a portion 6 threaded with a thread of opposite hand to the thread at 5 and passing through a nut portion 7 upon the cutter head $a$. The other end of the screwed rod 5, 6 has a hand wheel 8 thereon and an indexed wheel 9 for setting purposes. A locking pin 10 is for preventing rotation of the hand wheel 8 and index. A weight 11 (see Fig. 1) working in a dashpot 12 is attached by a chain or the like 13 to the block 14 so as to return the said block and the nut 4 to its initial position when the chain 2 slackens back as hereinafter described. The nut 4 is prevented from having any endwise movement by a bearing 15 supported in any suitable manner, not shown in Fig. 4.

The pawl $v$ is put out of action once during each revolution of the disk $u$ by the stop 16 (see Fig. 3) which engages the outer end 17 of the pawl.

With the arrangement aforesaid, the disk $u$ during one revolution winds the chain 2 on to the block $z$ and unwinds it from the block 3. The nut 4 is thus rotated and so imparts longitudinal movement to the screw 5, 6 which is locked against rotation by the pin 10. The cutter head is thus given the required backing-off or relieving motion from the nut 7. Upon the release of the chain by the pawl stop 16 acting on the pawl, the weight 11 returns the cutter head to its initial position. On the continued rotation of the disk $u$, the pawl $v$ again engages the disk $y$ and the cycle of operations is then repeated.

A weight 18 (see Fig. 1) may act directly upon the cutter head $a$ to assist in the return of the latter to its starting position after each backing-off stroke.

The rotary cutting tool $b$ is rotated by a belt on the pulley 19. The hand wheel 20 (see Fig. 1) is for traversing the cutter head along the bed $c$.

When the pin 10 is withdrawn, the hand wheel 8 can be rotated for setting the cutter slide $a$.

If desired, instead of employing the arrangement shown in Fig. 4 for setting the cutter head, we may employ an intermediate slide 20 (see Figs. 8 and 9) which has a definite fixed back and forth movement imparted thereto by the chain and screw and nut device as before described, while adjustment of the cutter head is effected by moving same upon the intermediate slide by a screw and nut device under the control of the hand wheel 8.

When working upon milling cutters of any considerable axial length, we may provide a pressure plate 21 (see Figs. 6 and 7) to act as a steady for the outer end of the cutting tool. Chatter of said tool is thus prevented.

By the employment of the improved construction before described, we obtain a very even motion of the cutter slide and obviate backlash in the actuating mechanism between the work mandrel and slide, resulting in high efficiency with rapidity of production.

We may vary the details of our improved mechanism to meet any particular requirements. The machine is particularly adapted for the production of thread milling cutters in an expeditious and economical manner.

Having now described our invention, what we claim as new, and desire to secure by Letters Patent is:

1. In relieving or backing-off lathes, in combination, a headstock, a work carrying mandrel supported in said headstock, means for rotating said mandrel, a movable headstock, means for traversing said headstock away from and toward the former headstock, a cross slide upon the movable headstock, a cutter carrying spindle upon said cross slide, means for rotating said cutter carrying spindle, a screw and nut device for cross traversing said cross slide, and means in operative connection with the means for rotating the work carrying spindle for actuating said screw and nut device, as set forth.

2. In relieving or backing-off lathes, in combination, a fixed headstock, a work carrying mandrel supported in said headstock, means for rotating said mandrel, a movable headstock, means for traversing said headstock away from and toward the fixed headstock, a cross slide upon said movable headstock, means for hand adjusting said cross slide upon the movable headstock, a cutter carrying spindle upon the cross slide, means for rotating the cutter carrying spindle, a screw and nut device for cross traversing said cross slide, means in operative connection with the means for rotating the work carrying spindle for rotating the nut in one direction, and means for rotating the nut in a reverse direction, as set forth.

3. In relieving or backing-off lathes, in combination, a fixed headstock, a work carrying mandrel supported in said headstock, means for rotating said mandrel, a movable headstock, means for traversing said headstock away from and toward the fixed headstock, a cross slide upon said movable headstock, means for hand adjusting said cross slide upon the movable headstock, a cutter carrying spindle upon the cross slide, means for rotating the cutter carrying spindle, a screw and nut device for cross traversing said cross slide, means in operative connection with the means for rotating the work carrying spindle for rotating the nut in one direction and a weight for rotating the nut in the reverse direction, as set forth.

4. In relieving or backing-off lathes, in combination, a fixed headstock, a work carrying mandrel supported in said headstock, means for rotating said mandrel, a movable headstock, means for traversing said headstock away from and toward the fixed headstock, a cross slide upon said movable headstock, means for hand adjusting said cross slide upon the movable headstock, a cutter carrying spindle upon the cross slide, means for rotating the cutter carrying spindle, a screw and nut device for cross traversing said cross slide, means in operative connection with the means for rotating the work carrying spindle for rotating the nut in one direction, means for disengaging the aforesaid means rotating the nut, and a weight working in a dashpot for rotating it in its reverse direction, as set forth.

5. In relieving or backing-off lathes, in combination, a fixed headstock, a work carrying mandrel supported in said headstock, means for rotating said mandrel, a movable headstock, means for traversing said headstock away from and toward the fixed headstock, a cross slide upon said movable headstock, means for hand adjusting said cross slide upon the movable headstock, a cutter carrying spindle upon the cross slide, means for rotating the cutter carrying spindle, a screw and nut device for cross traversing said cross slide, a disk, means in operative connection with the means for rotating the work carrying mandrel for rotating said disk, a chain in operative connection with said disk at one end and with said nut at the other end, means for disengaging said disk rotating means, and a weight suspended from and raised and lowered by the rotation of said nut, as set forth.

6. In relieving or backing-off lathes, in combination, a fixed headstock, a work carrying mandrel supported in said headstock, a worm and worm wheel for rotating said mandrel, a movable headstock, means for traversing said headstock away from and toward said fixed headstock, a cross slide upon said movable headstock, a cutter carrying spindle upon the cross slide, means for rotating said cutter carrying spindle, a screw engaging a lug on said cross slide, hand wheel for rotating said screw at one end, means for locking said hand wheel and the screw against rotation, a nut upon the screw at the other end, means in operative connection with the work carrying mandrel for rotating the nut in one direction, and automatic means for rotating the nut in a reverse direction, as set forth.

7. In relieving or backing-off lathes, in combination, a fixed headstock, a work carrying mandrel supported in said headstock, a worm and worm wheel for rotating said mandrel, a movable headstock, means for traversing said headstock away from and toward said fixed headstock, a cross slide upon said movable headstock, a cutter carrying spindle upon the cross slide, means for rotating said cutter carrying spindle, a screw engaging a lug on said cross slide, hand wheel for rotating said screw at one end, means for locking said hand wheel and the screw against rotation, a nut capable of rotary but not longitudinal movement upon the screw at the other end, a disk, means in operative connection with the means for rotating the work carrying mandrel for rotating said disk, a chain in operative connection with said disk and also with said nut, means for disengaging said disk rotating means, and a weight also in operative connection with said nut, as set forth.

8. In relieving or backing-off lathes, in combination, a fixed headstock, a work carrying mandrel supported in said headstock, a worm and worm wheel for rotating said mandrel, a movable headstock, means for traversing said movable headstock away from and toward said fixed headstock, a cross slide upon said movable headstock, a weight attached to and raised and lowered by the movements of said cross slide, a cutter carrying spindle upon the cross slide, means for rotating the cutter carrying spindle, a screw engaging a lug on said cross slide, hand wheel for rotating said screw at one end, means for locking said hand wheel means and the screw against rotation, a nut capable of rotary but not longitudinal movement upon the screw at the other end, a weight suspended from and raised and lowered by the rotation of said nut, a dash pot for said weight, a disk, a one-tooth clutch in operative connection with the mandrel rotating means for rotating said disk, means for disengaging said clutch, and a chain in operative connection with said disk and said nut, as set forth.

In testimony whereof we have signed our names to this specification in the presence of two subscribing witnesses.

HUBERT ARUNDEL.
JOSEPH HIGGINSON.

Witnesses:
HILDA HUGHES,
ARTHUR HUGHES.

Copies of this patent may be obtained for five cents each, by addressing the "Commissioner of Patents, Washington, D. C."